United States Patent
Li et al.

(10) Patent No.: US 10,739,228 B2
(45) Date of Patent: Aug. 11, 2020

(54) MULTILAYER CODING METHOD FOR DISTRIBUTED PHYSICAL MEASUREMENTS

(71) Applicant: NEC Laboratories America, Inc., Princeton, NJ (US)

(72) Inventors: Yaowen Li, Princeton, NJ (US); Jian Fang, West Windsor, NJ (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 22 days.

(21) Appl. No.: 16/258,588

(22) Filed: Jan. 26, 2019

(65) Prior Publication Data

US 2019/0234832 A1     Aug. 1, 2019

Related U.S. Application Data

(60) Provisional application No. 62/622,212, filed on Jan. 26, 2018.

(51) Int. Cl.
  *G01M 11/00*     (2006.01)
  *G01H 9/00*     (2006.01)

(52) U.S. Cl.
  CPC ........ *G01M 11/3136* (2013.01); *G01H 9/004* (2013.01); *G01M 11/3145* (2013.01)

(58) Field of Classification Search
  CPC ......... G01L 1/242; G01N 21/47; G01D 5/353
  See application file for complete search history.

(56) References Cited

U.S. PATENT DOCUMENTS

2013/0265569 A1* 10/2013 Le Floch ................ G01L 1/242
                                                  356/73.1
2017/0205255 A1*  7/2017 Nannipieri ......... G01D 5/35364

OTHER PUBLICATIONS

Prasant K. Sahu, "Analysis of Brillouin-Based Distributed Fiber Sensors Using Optical Pulse Coding", 2008 Optical Society of America (Year: 2008).*
F. Baronti,"SNR enhancement of Raman-based long-range distributed temperature sensors using cyclic Simplex codes"; Aug. 19, 2010 (Year: 2010).*
M. Taki, "High-performance hybrid Raman/fiber Bragg grating fiber-optic sensor based on simplex cyclic pulse coding", Feb. 15, 2013 Optics Letters (Year: 2013).*
Marcelo A. Soto, "Analysis of optical pulse coding in spontaneous Brillouin-based distributed temperature sensors", 2008 Optical Society of America (Year: 2008).*

* cited by examiner

*Primary Examiner* — Maurice C Smith
(74) *Attorney, Agent, or Firm* — Joseph Kolodka

(57) ABSTRACT

Aspects of the present disclosure describe a multilayer coding method for physical value measurements in which a multi-pulse pattern is generated through several layers, each of which is encoded with a different cyclic codeword. The total coding gain is the product of the gains of each layer advantageously allowing a long cyclic codeword to be replaced by combining several short cyclic codewords. Of particular advantage, methods according to the present disclosure provide better signal-to-noise characteristics, longer sensing distances and lower computational complexity particularly suitable for high-performance and cost-effective distributed optical fiber sensing (DOFS).

4 Claims, 22 Drawing Sheets

US 10,739,228 B2

MULTILAYER CODING METHOD FOR DISTRIBUTED PHYSICAL MEASUREMENTS

CROSS REFERENCE TO RELATED APPLICATIONS

This application claims the benefit of U.S. Provisional Patent Application Ser. No. 62/622,212 filed 26 Jan. 2018 the entire contents of which is incorporated by reference as if set forth at length herein.

TECHNICAL FIELD

This disclosure relates generally to sensing systems, methods, and structures. More particularly, it pertains to distributed optical fiber sensing (DOFS) employing optical time domain reflectometry (OTDR).

BACKGROUND

Distributed optical fiber sensing systems and methods offer a number of unprecedented features including the ability to monitor variations of physical and chemical parameters with special continuity along an optical fiber.

Given the utility and importance of DOFS systems and OTDR methods, improved methods employed in same would represent a welcome addition to the art.

SUMMARY

An advance in the art is made according to aspects of the present disclosure directed to an improved multilayer coding method for distributed physical value measurements employing optical time domain reflectometry.

Advantageously—and in sharp contrast to the prior art—systems, methods and structures according to aspects of the present disclosure, a multi-pulse pattern is generated through several layers, each of which is encoded with a different cyclic codeword. The total coding gain is the product of the gains of each layer advantageously allowing a long cyclic codeword to be replaced by combining several short cyclic codewords. Of particular advantage, methods according to the present disclosure provide better signal-to-noise characteristics, longer sensing distances and lower computational complexity particularly suitable for high-performance and cost-effective distributed optical fiber sensing (DOFS).

BRIEF DESCRIPTION OF THE DRAWING

A more complete understanding of the present disclosure may be realized by reference to the accompanying drawing in which.

Figure 1:
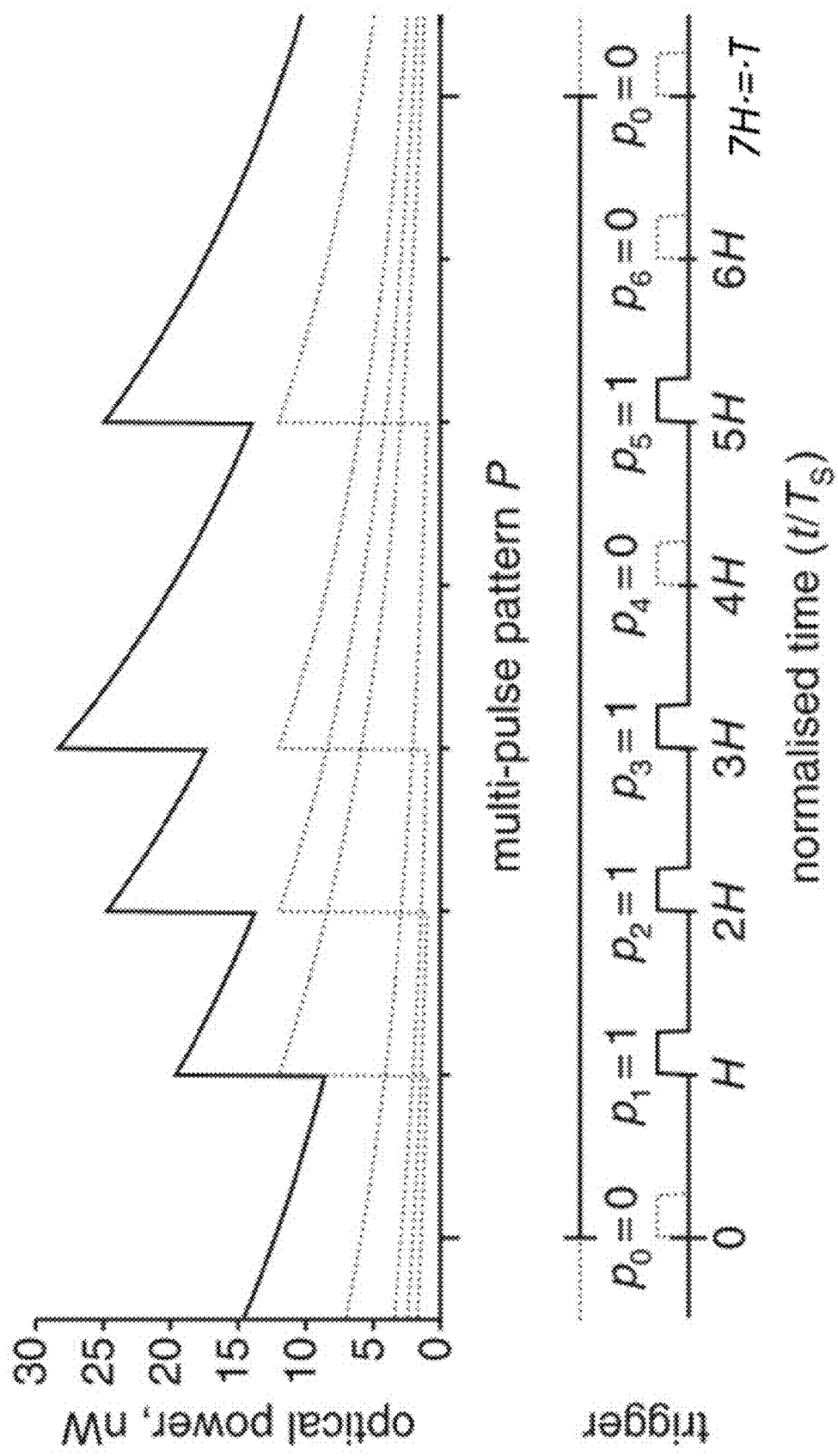
FIG. 1 is a set of plots illustrating principle(s) of cyclic Simplex coding with 7-bit codeword according to the prior art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that with an optical time domain reflectometry (OTDR) system for distributed optical fiber sensing (DOFS) a trade-off between spatial resolution and sensing distance must usually be made. To obtain a high spatial resolution, pump pulses exhibiting a short duration are usually required. However, a peak power of the pulses is restricted by the nonlinear thresholds in the fiber. Therefore, shorter pulse width means lower injected power, resulting in a deteriorated signal-to-noise ratio (SNR), which limits the sensing distance and performance.

To solve this problem, in the past decade the art has proposed several pulse coding techniques, such as Simplex codes or Golay codes As will be understood and appreciated by those skilled in the art, a "standard" coding technique in OTDR is based on sending pulse sequences defined by bit patterns of codewords. However, the pulse sequences have to be varied over time according to each codeword in the codebook and measurement results for each codeword first must to been stored before decoding and only after all the codewords have been alternated. Consequently, such a method does not support real-time decoding. In addition— for long distance sensing—such "standard" coding requires a larger memory, more complicated hardware and longer measurement time—which limits the performance of OTDR systems and increases the cost.

Advantageously, systems and methods according to the present disclosure solve the above problem while advancing the art by disclosing a multi-layer cyclic coding technique for DOFS. In sharp contrast to existing, prior-art methods, systems and methods according to the present disclosure exhibit marked signal-to-noise ratio (SNR) improvement, longer sensing distance and lower computational complexity. Accordingly—and of particular advantage—such systems and methods according to the present disclosure are especially suitable for a high-performance and cost-effective DOFS product.

In a method described by F. Baronti, A. Lazzeri, R. Roncella, R. Saletti, A. Signorini, M. A. Soto, G. Bolognini and F. Di Pasquale, in an article entitled "SNR enhancement of Raman-based long-range distributed temperature sensors using cyclic Simplex codes," that appeared in Electronic Letters 46(17) 1221, 2010, a binary cyclic Simplex codeword is used to encode optical pulse sequences. As described, the encoded optical pulse sequences results as a codeword, $P=[p_0, \ldots, p_{L-1}]$, is spread along the whole fiber, wherein L is the length of the codeword. Those skilled in the art will know that a repetition period for such a method should be not less than fiber round-trip time (RRT), and a time interval of each bit is inversely proportional to the code length.

As an example, the reader is directed to FIG. 1 which shows the principle of cyclic Simplex coding with 7-bit codeword $P=[p_0, p_1, \ldots, p_6]=[0\ 1\ 1\ 1\ 0\ 1\ 0\ 0]$ according to the prior art. Operationally, optical pulses are firstly generated with an interval of H=T/L, which T is the fiber RRT. Then, each pulse is binary modulated according to each bit in the cyclic codeword. The modulated multi-pulse pattern is repeatedly sent into fiber. The detected multi-pulse OTDR response of back-scattering signal x(t) is a superposition of the back-scattering signal of each bit pulse, as shown in FIG. 1.

In the decoding process, a single-pulse response is recovered from a multi-pulse response. If we consider the OTDR response of a single optical pulse is r(t), then the relationship between r(t) and x(t) can be described as:

$$X = SR = \begin{bmatrix} p_0 & p_1 & \cdots & p_{L-1} \\ p_{L-1} & p_0 & \cdots & p_{L-2} \\ \vdots & \vdots & \ddots & \vdots \\ p_1 & p_2 & \cdots & p_0 \end{bmatrix} R,$$

$$R = \begin{bmatrix} r(t) \\ r(t-H) \\ \vdots \\ r(t-(L-1)H) \end{bmatrix},$$

$$X = \begin{bmatrix} x(t) \\ x(t-H) \\ \vdots \\ x(t-(L-1)H) \end{bmatrix}$$

Then the OTDR matrix R can be recovered by $S^{-1}X$, which $S^{-1}$ is the inversion of matrix S. The OTDR response r(t) is obtained by compensating the delay of each row in R and averaging them together. The coding gain for such M-bit cyclic Simplex coding is $G_c=(L+1)/(2\sqrt{L})$.

By using this cyclic coding technique, distributed temperature sensing (DTS) based on Raman scattering has been demonstrated over 58 km single-mode fiber by employing 1023-bit cyclic Simplex codeword [See, e.g., M. A. Soto, T. Nannipieri, A. Signorini, G. Bolognini, F. Di Pasquale, A. Lazzeri, F. Baronti, and R. Roncella, "Advanced Cyclic Coding Technique for Long-Range Raman DTS Systems with Meter-Scale Spatial Resolution over Standard SMF," in Proceeding of IEEE Sensors 2011]. However—as will be readily appreciated by those skilled in the art—this technique has several limitations.

First, the generation of the cyclic Simplex codeword is based on the cyclic Hadamard difference set [See, e.g., H. Song and S. W. Golomb, "Some new constructions for Simplex codes," IEEE Transactions on Information Theory 40(2), 504-507, 1994.]. However, the number of existing cyclic Hadamard difference sets is limited, and it is very difficult to find a cyclic Hadamard difference set longer than 1023 bits [See, e.g., S. W. Golomb, "Cyclic Hadamard Difference Sets—Constructions and Applications," in the book *Sequences and their Applications*, Chapter 3, Springer, 1999].

Additionally—for long sensing distance—a long-bit codeword requires a massive memory space for storing the response matrices X and R, which will increase the cost of a product employing such method(s).

Finally—when the bit length is long—the decoding process involves a large matrix inversion ($S^{-1}$), which significantly raises the complexity of signal processing.

Now, as we shall show and describe, the above problems are solved and an advance is made in the art according to aspects of the present disclosure directed to a multi-layer cyclic coding method including significant advances in encoding and decoding process(es).

According to aspects of the present disclosure, a multi-pulse pattern is generated through several layers, each of which is encoded with a different cyclic codeword. The resulting total coding gain is the product of the individual gains of each layer. Therefore—and a particular advantage of our methods—a long cyclic codeword can be replaced by combining several short cyclic codewords, which can significantly reduce the computational complexity and storage requirement. Moreover, methods according to the present disclosure advantageously may generate a very long cyclic codeword, which is especially suitable for long-distance DOFS.

As a result, methods according to the present disclosure provide several significant advantages over the prior art including:

Better Performance is realized as measured by a longer cyclic codeword length, higher signal-to-noise (SNR) ratio, and ultra-long distance distributed fiber sensing—as compared with prior art methods;

Lower Complexity is realized as large matrix inversion and manipulation is replaced by several small matrices inversions, which significantly reduces computational complexity;

Lower cost is realized as our method requires a smaller memory space to store data, which can significantly reduce the cost of product employing the method; and Easy deployment as our method may be easily deployed in an existing coded OTDR product by adding multi-layer coding and decoding modules according to the present disclosure.

Figure 2:
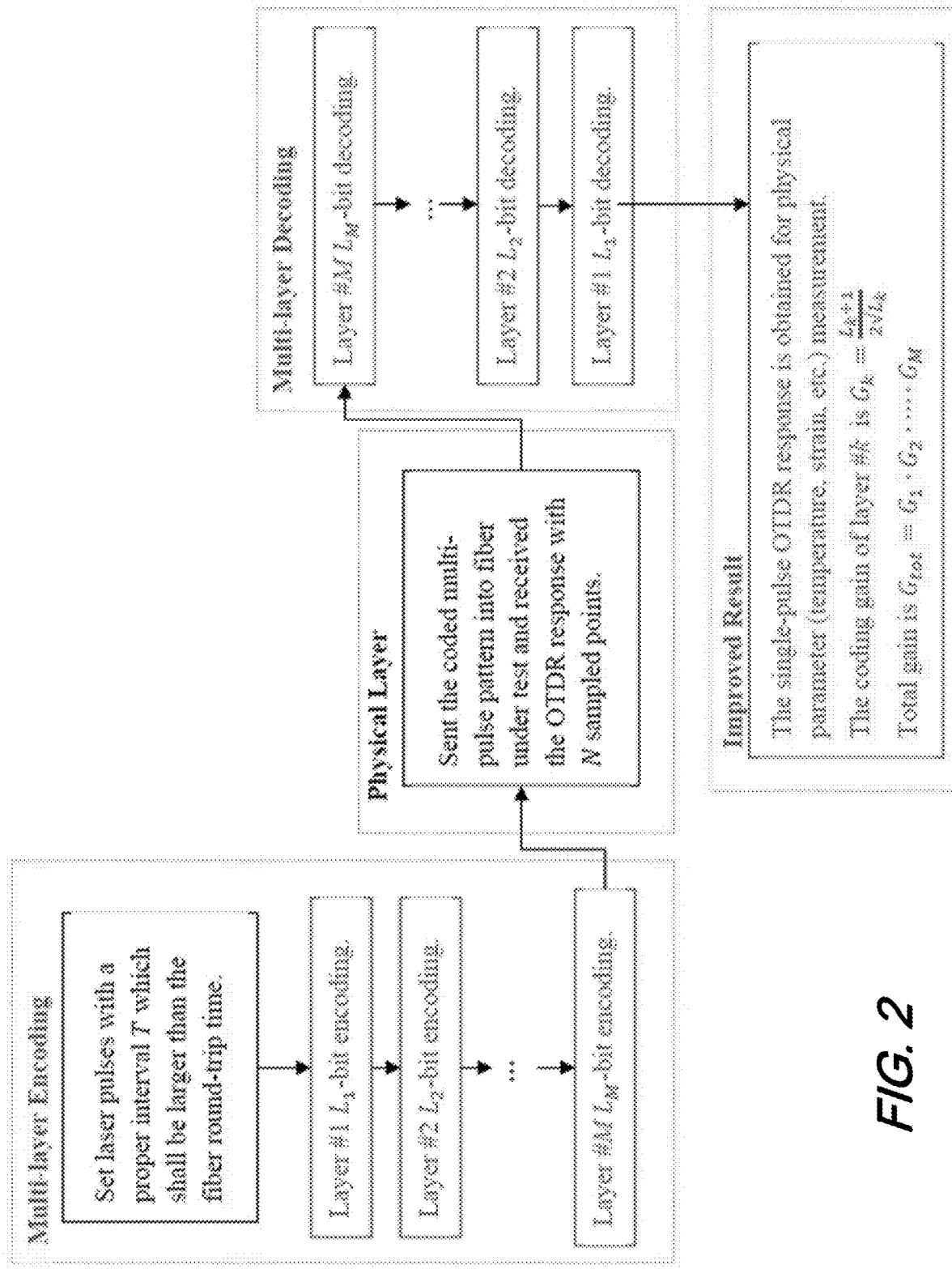
FIG. 2 is a flow diagram illustrating an overall method of multilayer coding method according to aspects of the present disclosure.

Turning now to FIG. 2, there is shown a flow diagram illustrating a multi-level coding method according to aspects of the present disclosure which illustratively shows multi-layer encoding; physical layer operations, multi-layer decoding; and highlights several improved results from our method.

As may be observed from that flow diagram—operationally—OTDR laser pulses are set such that they exhibit an interval T that is larger than the round trip time of optical pulses through an optical fiber under test (OFUT). The multi-layer encoding then is performed on multi-pulses emitted from the laser. In particular, Layer #1, $L_1$-bit encoding is followed by Layer #2, $L_2$-bit encoding which in turn is followed by remaining layers up to and including Layer # M, $L_M$-bit encoding.

We note that $L_1 \ldots L_M$ need to be mutually prime and the total code length can be much longer that 1023 bits.

The coded multi-pulse pattern are sent into the OFUT and an OTDR response with N sampled points is received.

The response then undergoes a multi-layer decoding in which Layer # M, $L_M$-bit decoding is followed by all intermediate layers up to and including Layer #2, $L_2$-bit decoding which in turn is followed by remaining Layer #1, $L_1$-bit decoding.

Advantageously, and as we shall show and describe, a single-pulse OTDR response is then obtained for physical parameter (i.e., temperature, strain, etc) measurement. Note that the coding gain of layer # k is represented by:

$$G_k = \frac{L_k + 1}{2\sqrt{L_k}}$$

and the total gain is represented by $G_{tot}=G_1 \cdot G_2, \ldots, G_M$.

Figure 3:
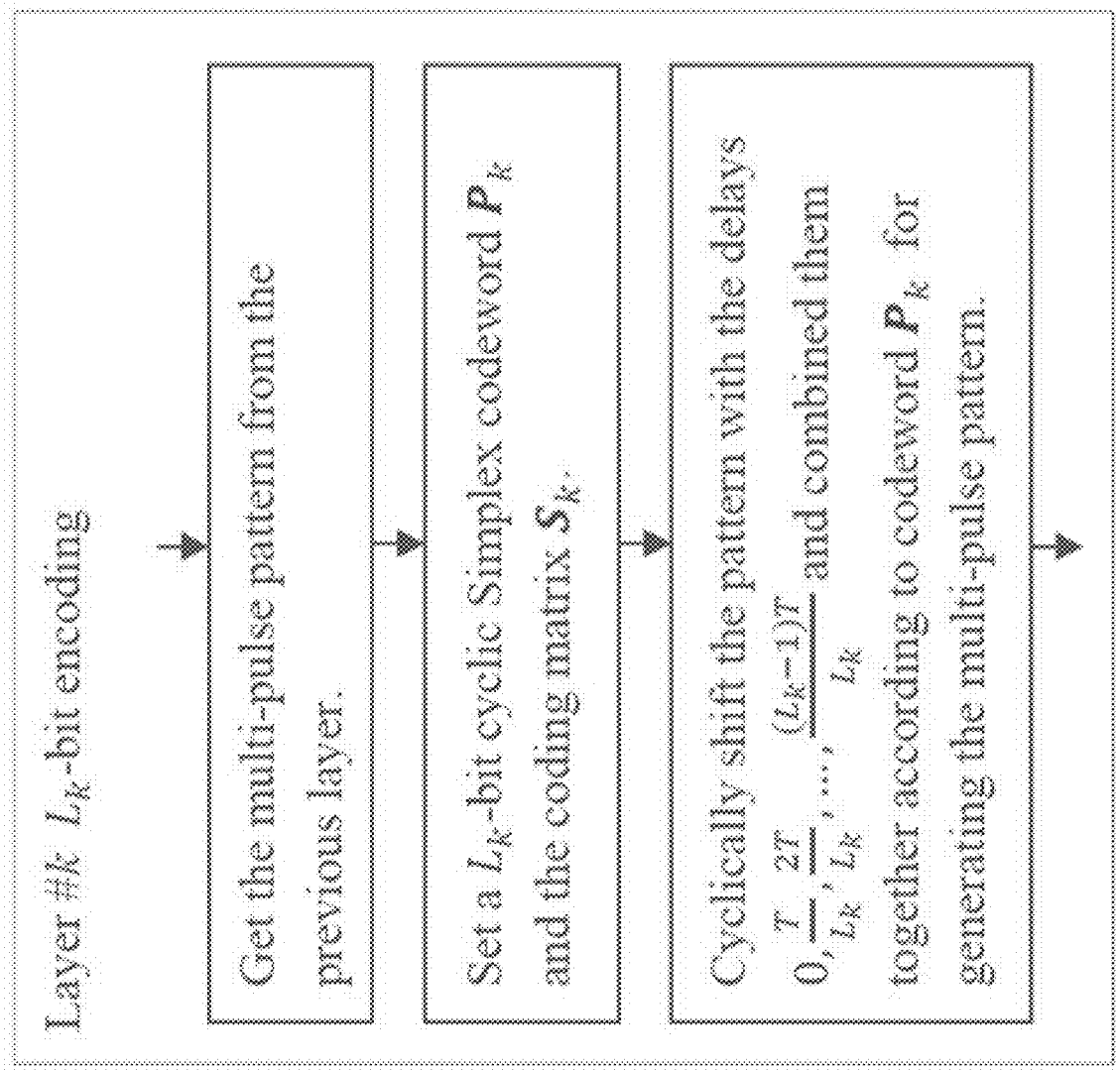
FIG. 3 is a flow diagram illustrating a layer # k-bit encoding method according to aspects of the present disclosure.

FIG. 3 is a flow diagram illustrating a layer # k-bit encoding method according to aspects of the present disclosure. As may be observed from that diagram, layer # k, $L_k$-bit encoding is performed by first receiving a multi-pulse pattern from a previous layer; setting a $L_k$ bit cyclic Simplex codeword $P_k$ and a coding matrix $S_k$; cyclically shifting the pattern with delays $$0, \frac{T}{L_k}, \frac{2T}{L_k}, \ldots, \frac{(L_k-1)T}{L_k}$$

and combining them together according to codework $P_k$ for generating a multi-pulse pattern. We note that with respect to the $L_k$-bit cyclic Simplex codeword, it is easier to set a cyclic Simplex code with a short bit length (such as 3, 7, 15, 63, 255, 511, etc) than finding one with a long bit-length (>1023)

Figure 4:
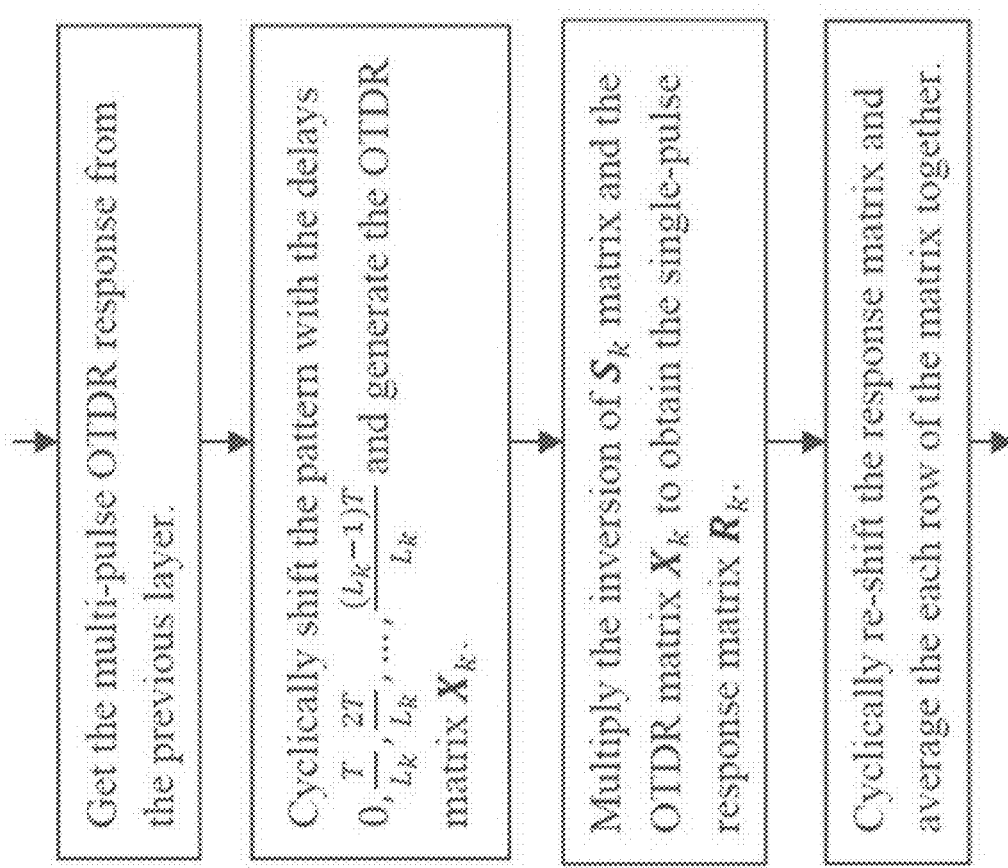
FIG. 4 is a flow diagram illustrating a # k-bit decoding method according to aspects of the present disclosure.

FIG. 4 is a flow diagram illustrating a # k-bit decoding method according to aspects of the present disclosure. As may be observed from that diagram, layer # k, $L_k$-bit decoding is performed by first receiving a multi-pulse pattern from a previous layer; and cyclically shifting the pattern with the delays $$0, \frac{T}{L_k}, \frac{2T}{L_k}, \ldots, \frac{(L_k-1)T}{L_k}$$

to generate an OTDR matrix $X_k$. Next, the inversion of $S_k$ matrix is multiplied by the OTDR matrix $X_k$ to obtain a single pulse response matrix $R_k$. The response matrix and the average of each row of the matrix are then cyclically reshifted.

We note that with respect to the decoding cyclic shifting, the required storage space is only $L_{max} \times N$ ($L_{max}=\max[L_1, \ldots, L_M]$), which is much smaller than prior art approaches. Note further, that with respect to the matrix inversion multiplication, the maximum inverted matrix size ins only $L_{max} \times L_{max}$—which is much smaller than prior methods providing evidence that methods according to the present disclosure are significantly less complex as compared to the art. Finally, we note that with respect to the cyclic re-shift of the response matrix, the coding gain of this layer is represented by $$G_k=(L_k+1)/(2\sqrt{L_k}).$$

Figure 5:
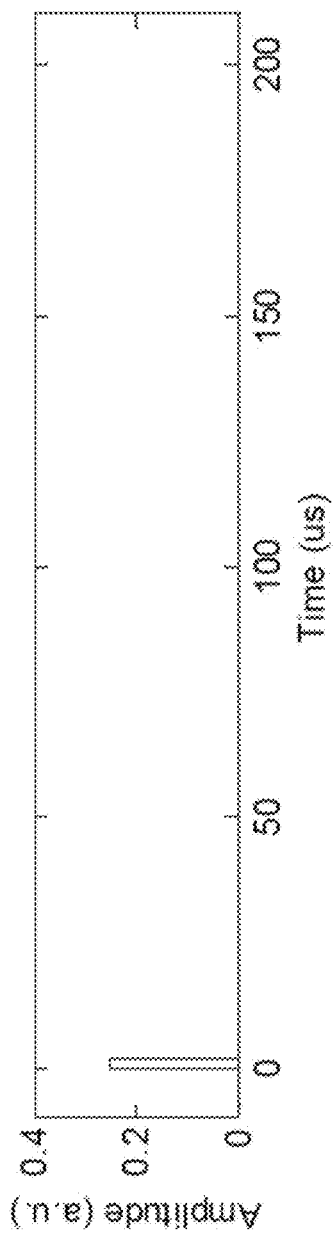
FIG. 5 is a plot illustrating an original signal pulse for an illustrative 7×3 bit dual-layer cyclic coding in which a first layer is a 7-bit cyclic Simplex code with codeword $P_1$=[1 1 1 0 1 0 0]; a second layer is a 3-bit Simplex code with codeword $P_2$=[1 0 1]; and Sensing length=21 km, round-trip time T=210 μsec according to aspects of the present disclosure.

At this point we now show an example of a 7×3 bit dual-layer cyclic coding. FIG. 5 is a plot illustrating an original signal pulse for an illustrative 7×3 bit dual-layer cyclic coding in which a first layer is a 7-bit cyclic Simplex code with codeword $P_1$=[1 1 1 0 1 0 0]; a second layer is a 3-bit Simplex code with codeword $P_2$=[1 0 1]; and Sensing length=21 km, round-trip time T=210 μsec according to aspects of the present disclosure.

Figure 6:
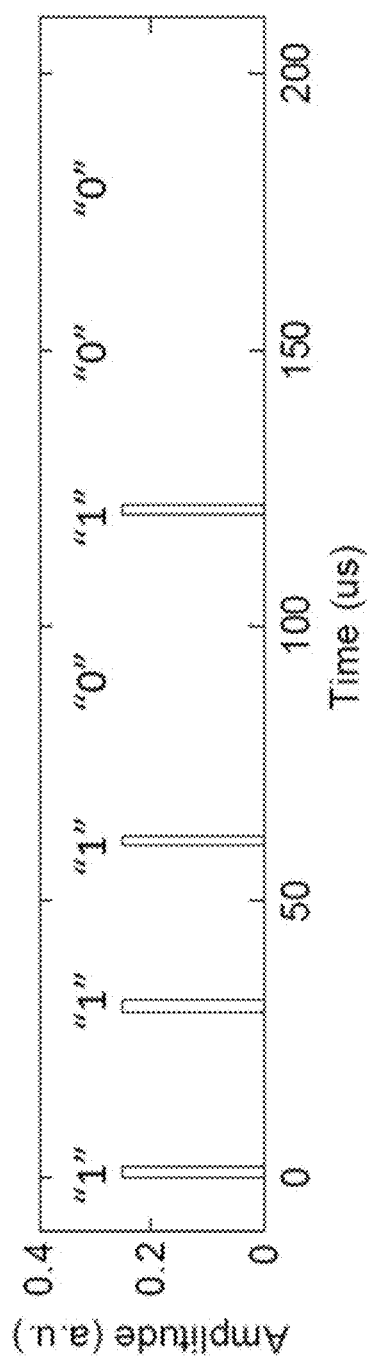
FIG. 6 is a plot illustrating a first-layer encoding with 7-bit Simplex codeword according to aspects of the present disclosure.

FIG. 6 is a plot illustrating a first-layer encoding with 7-bit Simplex codeword according to aspects of the present disclosure.

Figure 7:
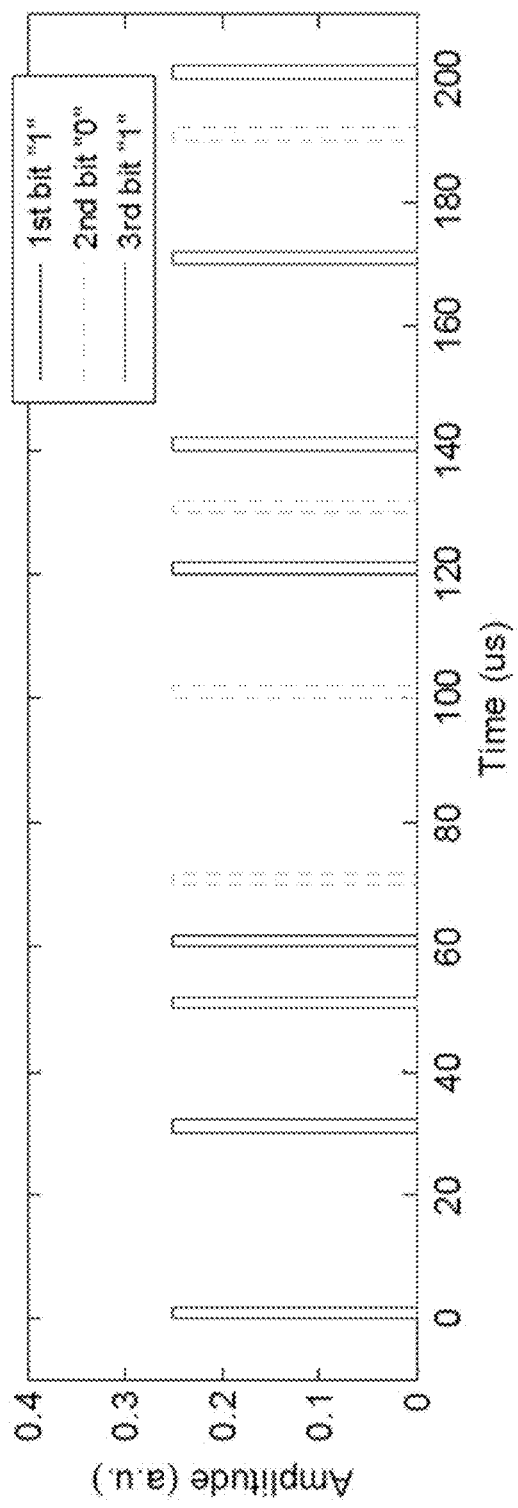
FIG. 7 is a plot illustrating a second-layer with 3-bit Simplex codeword according to aspects of the present disclosure.

FIG. 7 is a plot illustrating a second-layer with 3-bit Simplex codeword according to aspects of the present disclosure. Note that pulses shown as dashed lines indicate they have been removed due to a "0" bit in the second layer. Accordingly, the final multi-pulse pattern is the pulses shown in solid lines.

Figure 8:
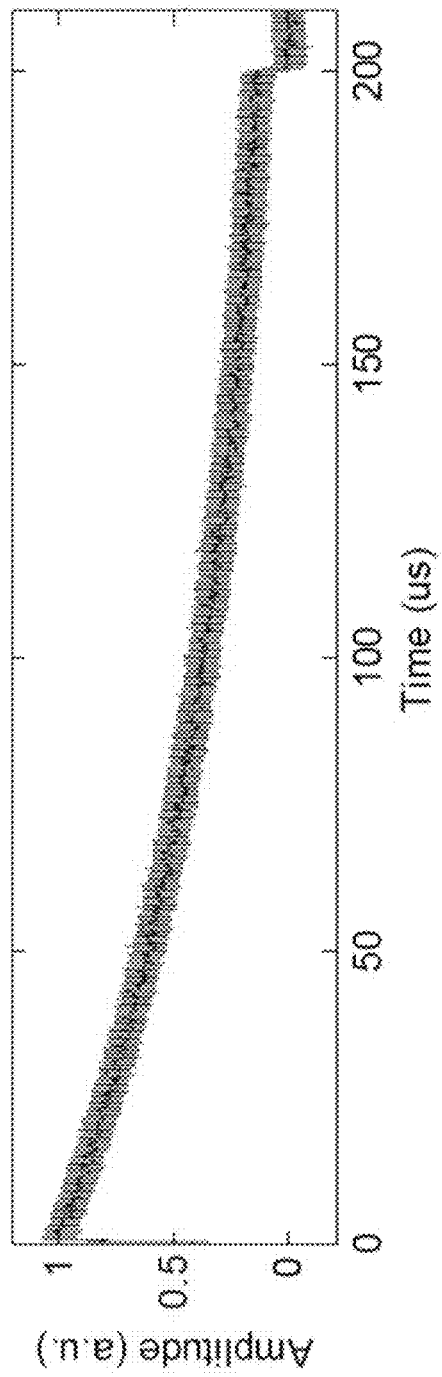
FIG. 8 is a plot of an OTDR response of a single-pulse with added Gaussian noise with a standard deviation of 0.02 according to aspects of the present disclosure.
Figure 9:
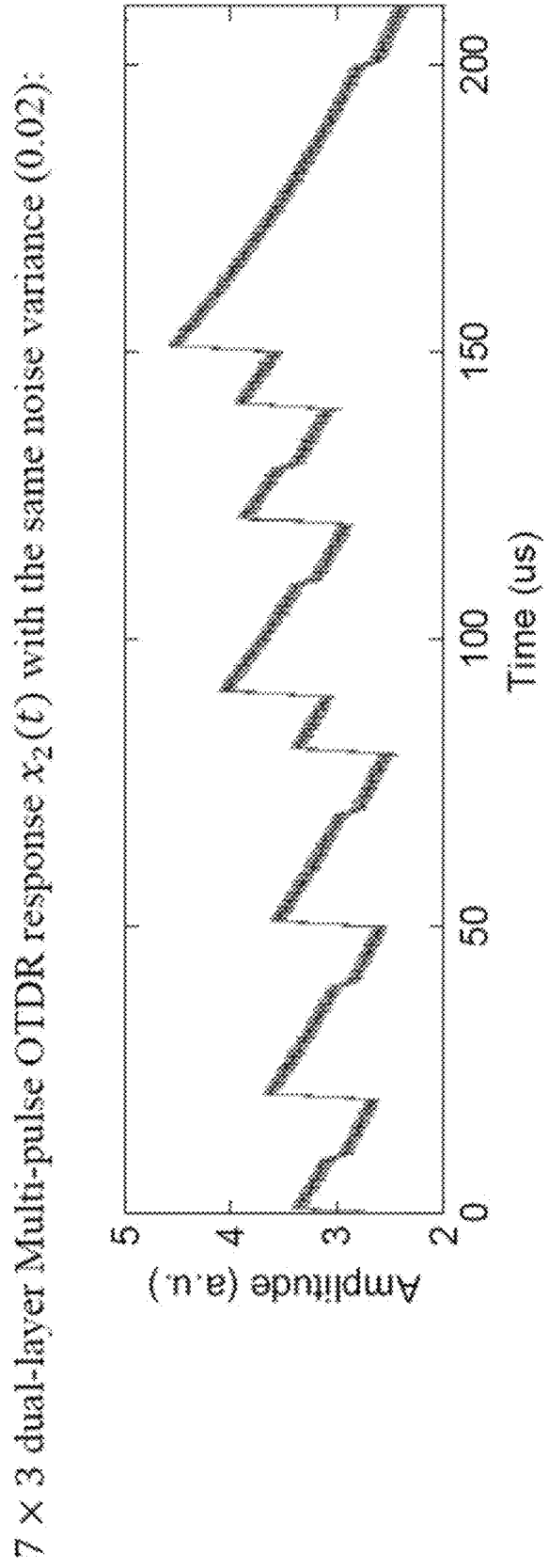
FIG. 9 is a plot of a 7×3 dual-layer Multi-pulse OTDR response $x_2(t)$ with noise variance 0.02 according to aspects of the present disclosure.

To validate our inventive methods, we performed a number of simulations in which:

FIG. 8 is a plot of an OTDR response of a single-pulse with added Gaussian noise with a standard deviation of 0.02 according to aspects of the present disclosure; and FIG. 9 is a plot of a 7×3 dual-layer Multi-pulse OTDR response $x_2(t)$ with noise variance 0.02 according to aspects of the present disclosure.

Figure 10:
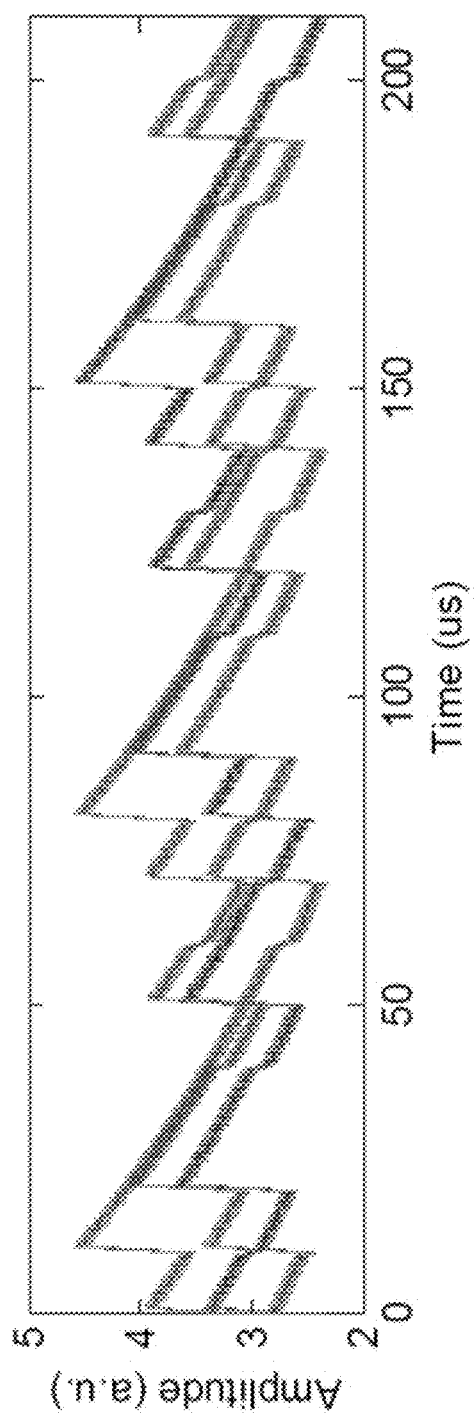
FIG. 10 is a plot of second layer multi-pulse OTDR response matrix $X_2$ according to aspects of the present disclosure.

For the decoding process of the simulations, FIG. 10 is a plot of second layer multi-pulse OTDR response matrix $X_2$ according to aspects of the present disclosure.

Figure 11:
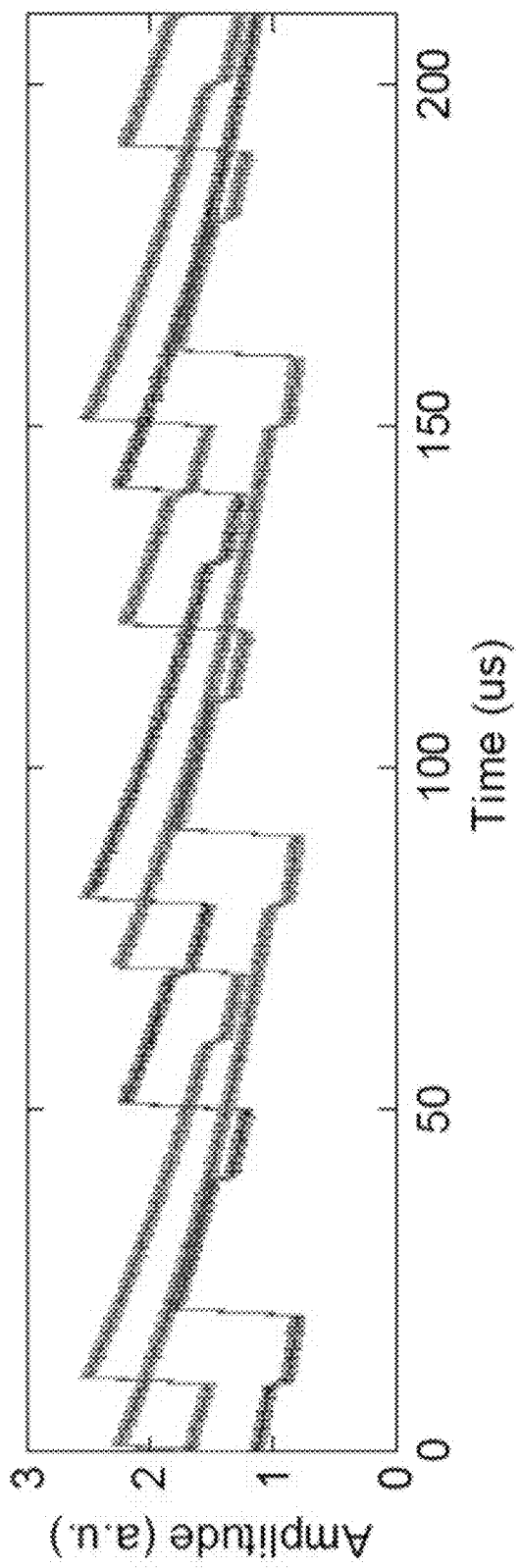
FIG. 11 is a plot of second layer single-pulse OTDR response matrix $R_2$ according to aspects of the present disclosure.
Figure 12:
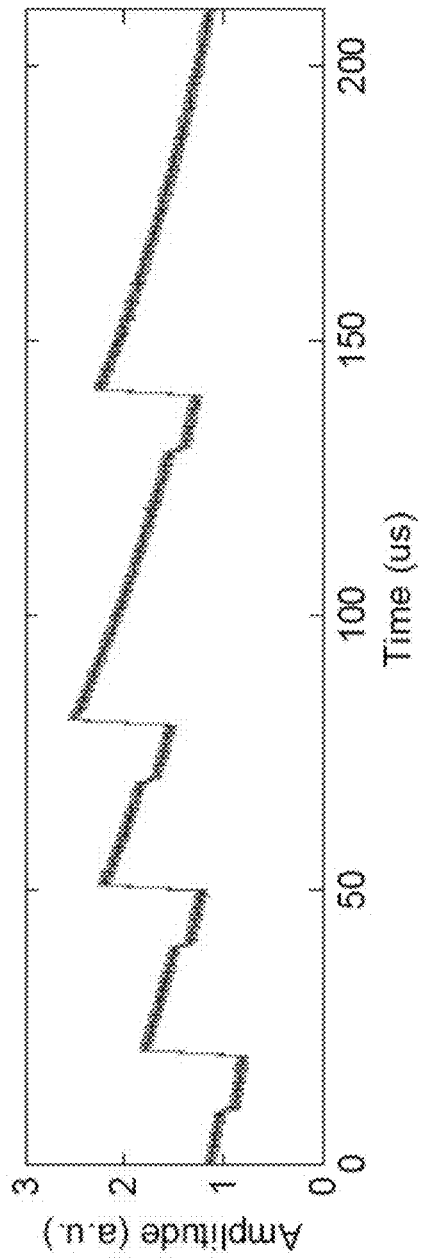
FIG. 12 is a plot of second layer single-pulse response $x_1(t)$—where single means the multi-pulse pattern from previous layer according to aspects of the present disclosure.
Figure 13:
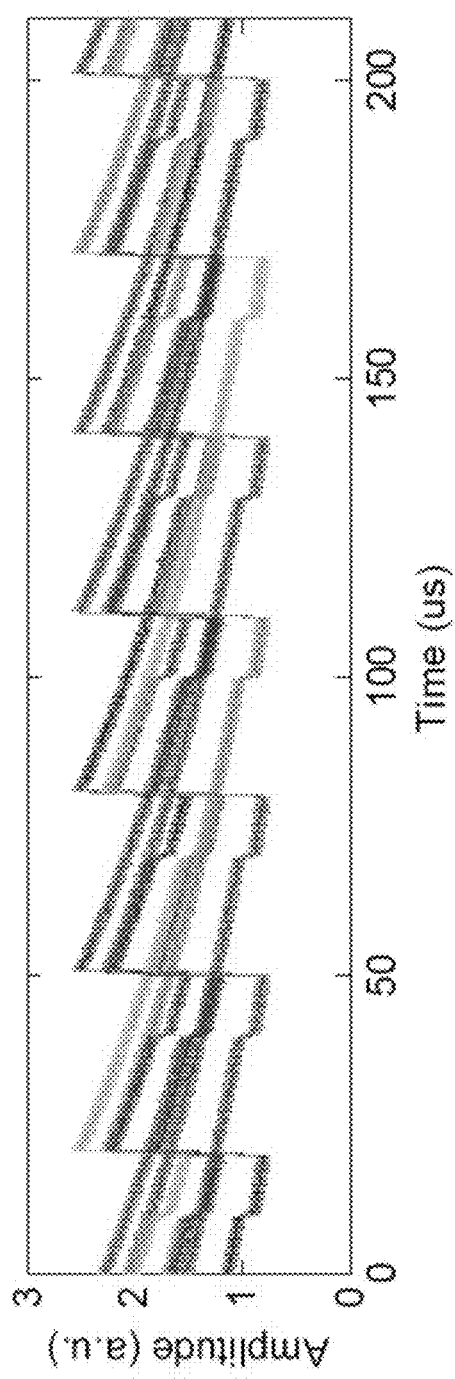
FIG. 13 is a plot of first layer multi-pulse OTDR response matrix $X_1$ according to aspects of the present disclosure.
Figure 14:
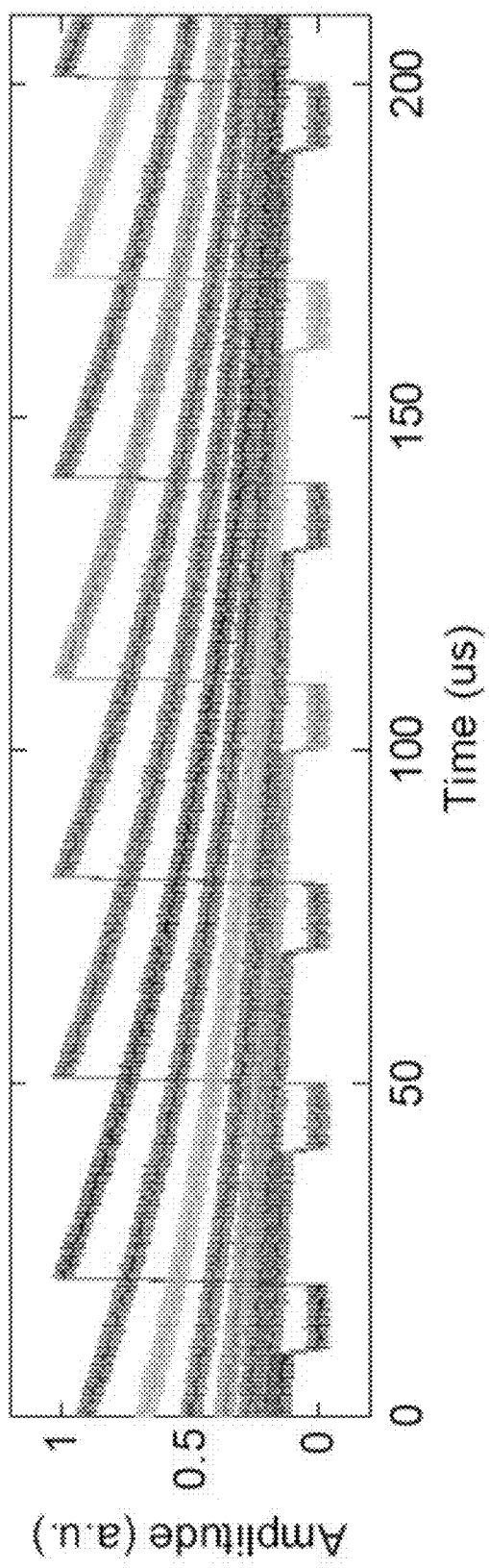
FIG. 14 is a plot of first layer single pulse OTDR response matrix $R_1(t)$ according to aspects of the present disclosure.
Figure 15:
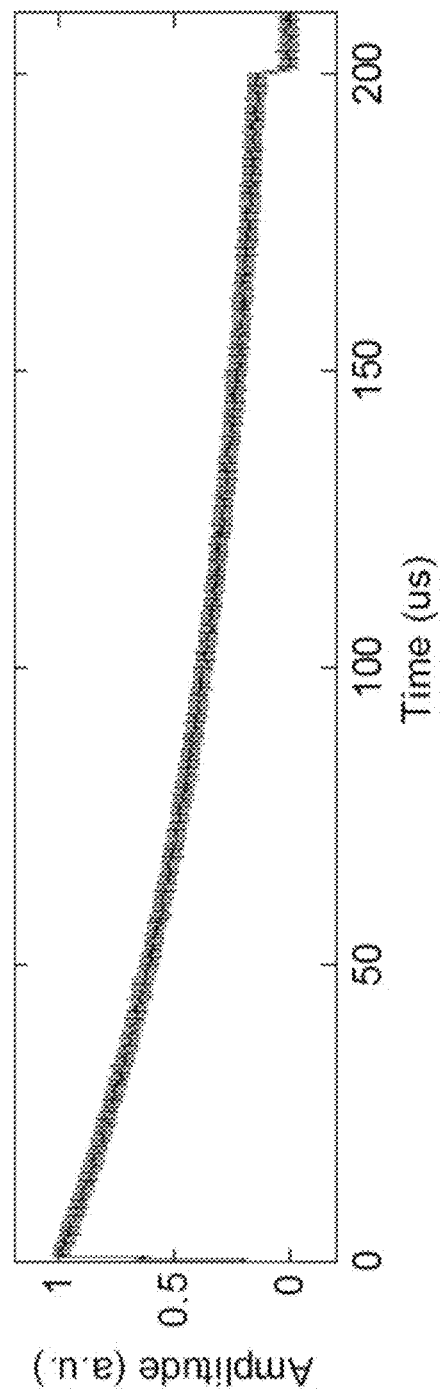
FIG. 15 is a plot of first layer single pulse OTDR response r(t)—the final result used for measurement—according to aspects of the present disclosure.

FIG. 11 is a plot of second layer single-pulse OTDR response matrix $R_2$ according to aspects of the present disclosure;

FIG. 12 is a plot of second layer single-pulse response $x_1(t)$—where single means the multi-pulse pattern from previous layer according to aspects of the present disclosure;

FIG. 13 is a plot of first layer multi-pulse OTDR response matrix $X_1$ according to aspects of the present disclosure;

FIG. 14 is a plot of first layer single pulse OTDR response matrix $R_1(t)$ according to aspects of the present disclosure; and FIG. 15 is a plot of first layer single pulse OTDR response r(t)—the final result used for measurement—according to aspects of the present disclosure in which the standard deviation of noise at a far end is 0.0115.

Significantly, with respect to these simulation results, we note that the coding gain in the $1^{st}$ layer $G_1=2/\sqrt{3}$, $2^{nd}$ layer $G_2=4/\sqrt{7}$. Consequently, the total gain is $G_{tot}=G_1G_2=1.7457$. Since the original standard deviation of noise is 0.02, the noise after coding shall be $$\frac{0.02}{1.7457} = 0.0115,$$

which perfectly matches our theoretical expectation

Figure 16:
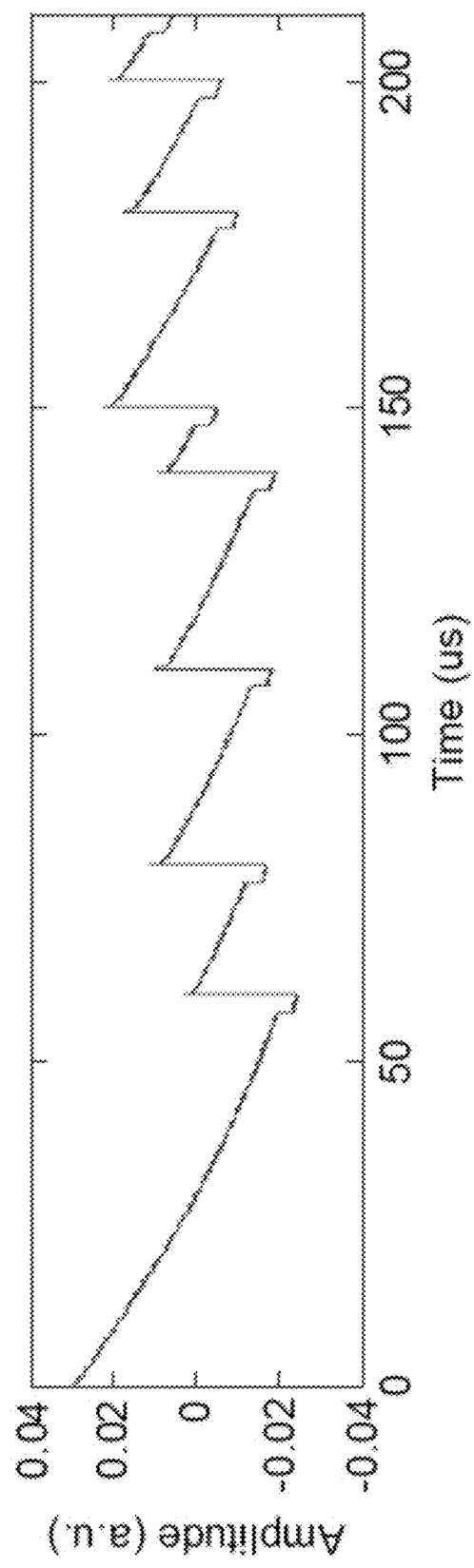
FIG. 16 is a plot of an experimental 7×3 dual-layer Multi-pulse OTDR response $x_2(t)$ with 10 k times averaging and digital filter according to aspects of the present disclosure.
Figure 17:
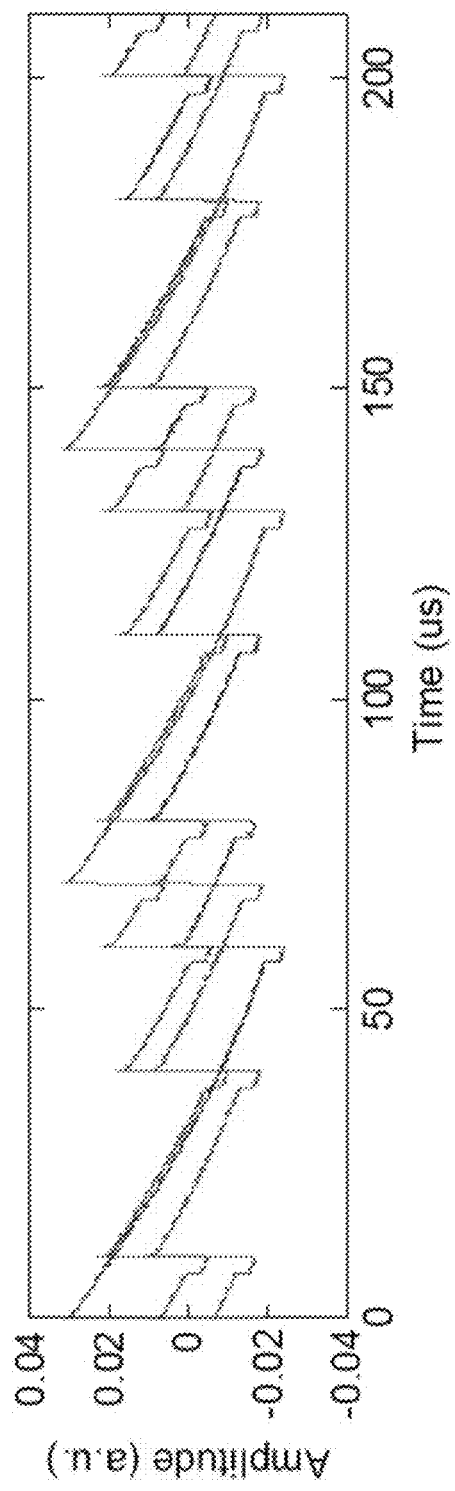
FIG. 17 is a plot of experimental second layer multi-pulse OTDR response matrix $X_2$ according to aspects of the present disclosure.
Figure 18:
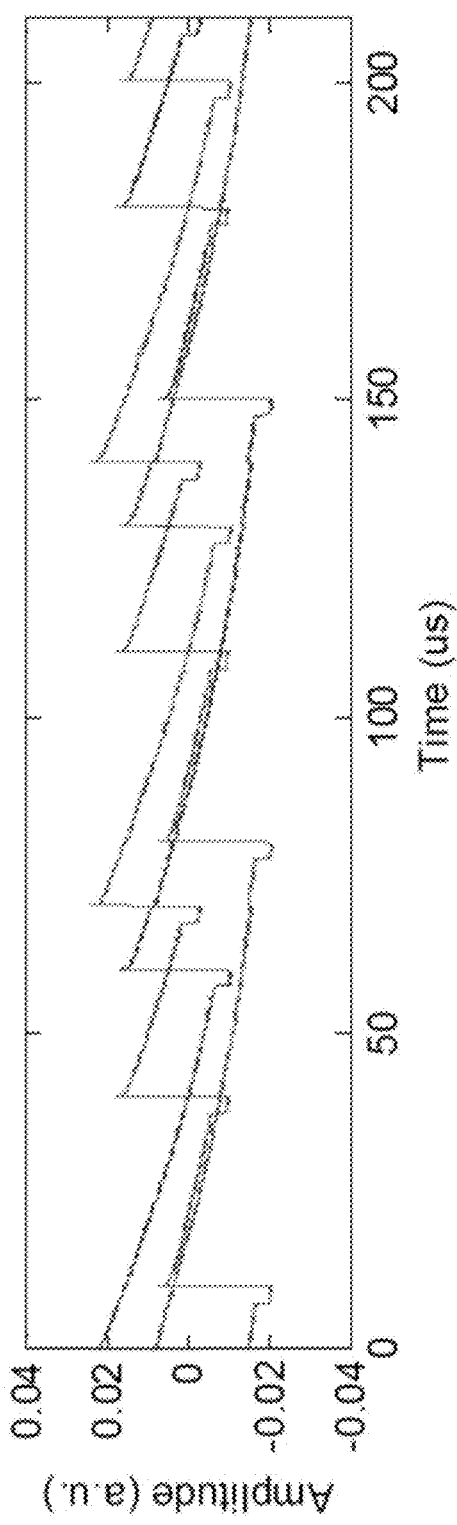
FIG. 18 is a plot of experimental second layer single-pulse OTDR response matrix $R_2$ according to aspects of the present disclosure.
Figure 19:
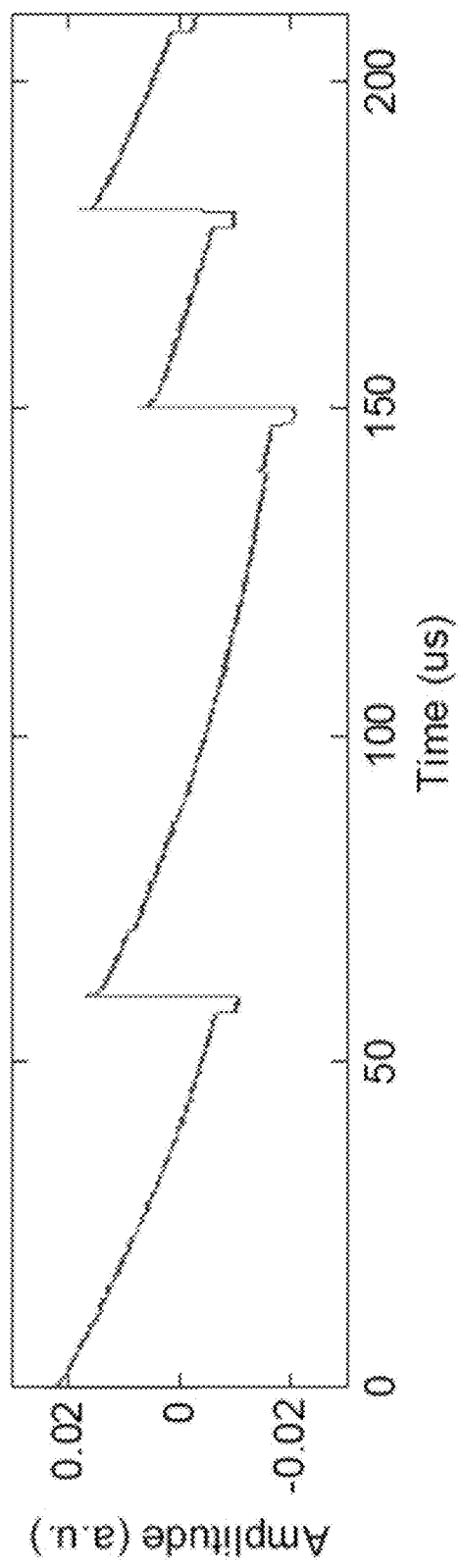
FIG. 19 is a plot of experimental second layer single-pulse response $x_1(t)$—where single means the multi-pulse pattern from previous layer according to aspects of the present disclosure.
Figure 20:
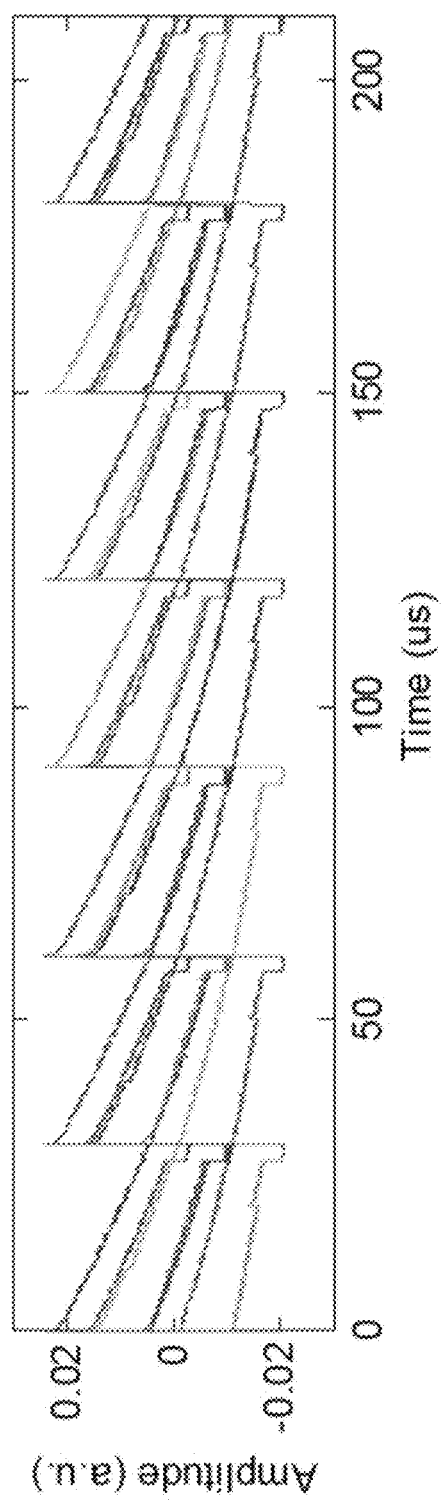
FIG. 20 is a plot of experimental first layer multi-pulse OTDR response matrix $X_1$ according to aspects of the present disclosure.
Figure 21:
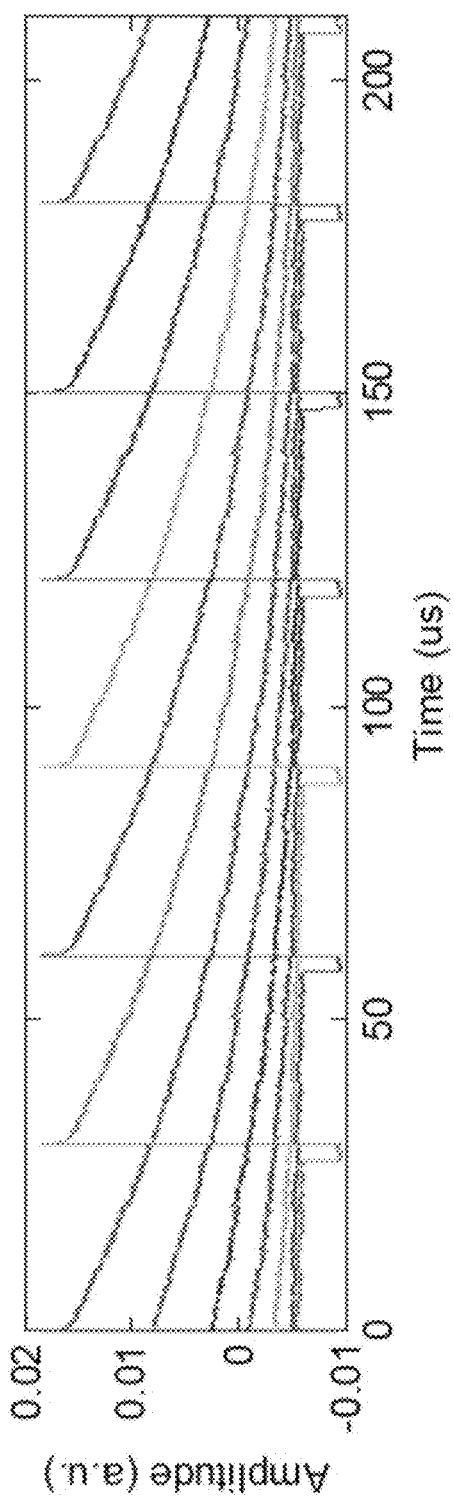
FIG. 21 is a plot of experimental first layer single pulse OTDR response matrix $R_1(t)$ according to aspects of the present disclosure.
Figure 22:
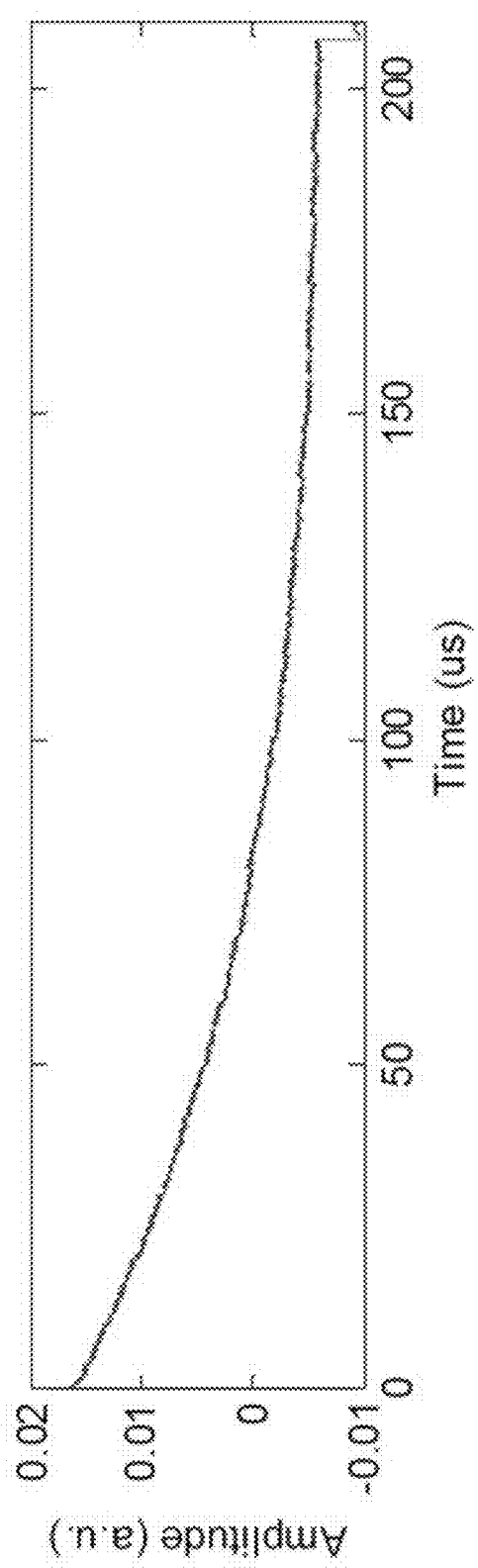
FIG. 22 is a plot of experimental first layer single pulse OTDR response r(t)—the final result used for measurement—according to aspects of the present disclosure.

To further validate our inventive method, a Raman-based OTDR is conducted within 21 km standard single-mode fiber. As in the simulation, we use the 7×3 dual-layer cyclic Simplex coding. The experimental results are shown in the following figures in which:

FIG. 16 is a plot of an experimental 7×3 dual-layer Multi-pulse OTDR response $x_2(t)$ with 10k times averaging and digital filter according to aspects of the present disclosure;

FIG. 17 is a plot of experimental second layer multi-pulse OTDR response matrix $X_2$ according to aspects of the present disclosure;

FIG. 18 is a plot of experimental second layer single-pulse OTDR response matrix $R_2$ according to aspects of the present disclosure;

FIG. 19 is a plot of experimental second layer single-pulse response $x_1(t)$—where single means the multi-pulse pattern from previous layer according to aspects of the present disclosure;

FIG. 20 is a plot of experimental first layer multi-pulse OTDR response matrix $X_1$ according to aspects of the present disclosure;

FIG. 21 is a plot of experimental first layer single pulse OTDR response matrix $R_1(t)$ according to aspects of the present disclosure; and FIG. 22 is a plot of experimental first layer single pulse OTDR response r(t)—the final result used for measurement—according to aspects of the present disclosure.

From these experimental results we note that our multi-layer coding method works very well with Raman based OTDR systems.

At this point, while we have presented this disclosure using some specific examples, those skilled in the art will recognize that our teachings are not so limited. Accordingly, this disclosure should be only limited by the scope of the claims attached hereto.

The invention claimed is:

1. A coding method for optical time domain reflectometry (OTDR) for distributed optical fiber sensing (DOFS), the method comprising injecting a series of optical pulses into the optical fiber, detecting light scattered or reflected back from points along the fiber and determining, from the detected light physical characteristics of the optical fiber, said method CHARACTERIZED BY:
   multi-layer coding of the injected pulses;
   multi-layer decoding of the detected light (OTDR response);
   each of the multiple layers is encoded with a different cyclic codeword; and
   a total coding gain is the product of individual gains, one for each of the layers.

2. The coding method of claim 1 FURTHER CHARACTERIZED BY:
   short codewords (<1024 bits each) are used for each codeword.

3. The coding method of claim 2 FURTHER CHARACTERIZED BY:
   the optical pulses are generated by a laser and injected into the optical fiber are injected at an interval T that is larger than a fiber round-trip time for an individual pulse.

4. The coding method of claim 3 FURTHER CHARACTERIZED BY:
   setting an L-bit cyclic binary Simplex codeword P and an L-by-L coding matrix S, and cyclically shifting the laser generated optical pulse with delays $$0, \frac{T}{L_k}, \frac{2T}{L_k}, \cdots, \frac{(L_k - 1)T}{L_k}$$

and combining them together according to codewod $P_k$ to generate multi-pulse pattern to inject into the optical fiber and subsequently receiving the OTDR response with N sampled points.

* * * * *